Dec. 31, 1968   F. D. GOSSETT   3,419,242
CAMPER HOLD-DOWN DEVICE
Filed Aug. 29, 1967
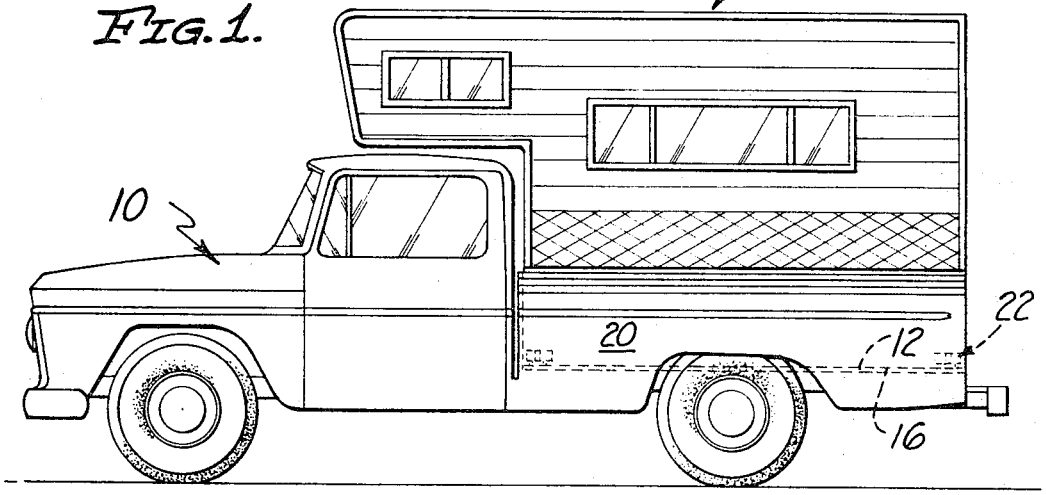
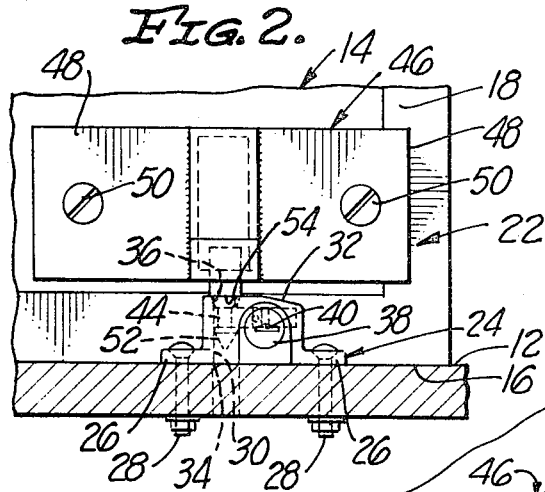
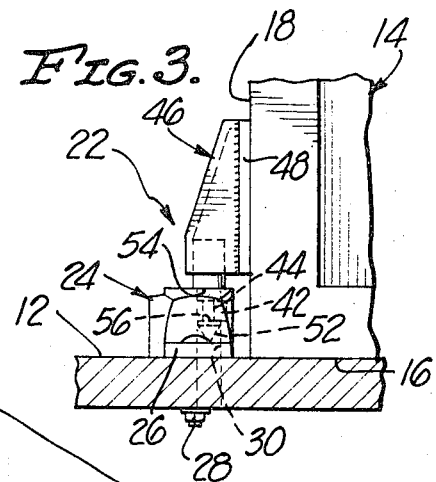
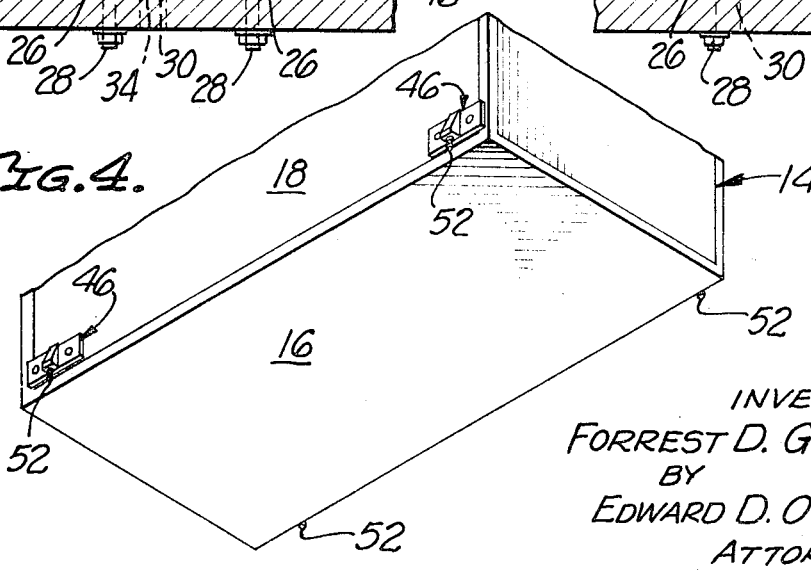
INVENTOR
FORREST D. GOSSETT
BY
EDWARD D. O'BRIAN
ATTORNEY United States Patent Office 3,419,242
Patented Dec. 31, 1968

3,419,242
CAMPER HOLD-DOWN DEVICE
Forrest D. Gossett, Orange, Calif.
(1905 Jacalene, Anaheim, Calif. 92802)
Filed Aug. 29, 1967, Ser. No. 664,187
6 Claims. (Cl. 248—361)

ABSTRACT OF THE DISCLOSURE

Structures are shown for holding a body such as a camper body upon a vehicle bed such as the bed of a pickup truck in such a manner that the body is securely locked in place upon the bed so that it cannot be undesirably removed from the bed. Each of these structures constitutes a holding means having a holder adapted to be secured permanently to the bed and a headed projection secured to the body so as to be capable of being inserted in the holder to which it corresponds when the body is located upon the bed. The holder is preferably provided with lock means for engaging the headed projection so as to prevent its movement with respect to the holder. A plurality of such holding means are preferably used at a number of points on the vehicle bed and on the body.

Cross references to related applications

None.

Background of the invention

Frequently, it is desired to utilize a body structure such as a so-called camped body in conjunction with a vehicle bed such as the bed of a common pick-up truck. At the present time when such bodies are used on such beds it is common place to merely set them in place so that they are held with respect to the bed primarily by the action of gravity. This is disadvantageous because of several different factors.

As a vehicle such as a camper is operated, it is frequently subjected to high winds. Such winds have been known to tip a camper body off of a common pickup truck. Obviously, when this occurs there is an economic loss. Further, as a vehicle such as a pickup is operated, periodically a body such as a camper located on such a vehicle will tend to be thrown off of the vehicle, as for example, when a curve is taken too rapidly or when the vehicle is operated on a relatively steep slope. If a camper should be moved off of a vehicle body in any such manner there would of course also be an economic loss.

As a result of these factors, a number of different structures have been developed for use in holding campers or similar bodies to the beds of vehicles such as common pickup trucks. Frequently, such structures involve the use of brackets and various type permanent or semi-permanent fastenings. It is common to see a camper body secured to a pickup truck by turnbuckles which are tightened so as to hold the camper in place. Frequently, means of this type are disadvantageous because they require modification of attachment to visible and/or comparatively weak parts of a vehicle. Occasionally however various means of this nature require comparatively difficult installation involving various parts of a vehicle.

Such permanent or semi-permanent type means for securing a body such as a camper to a vehicle bed are considered disadvantageous for a number of reasons. Certain of these reasons involve installation complications and various factors such as are indicated in the preceding paragraph. It is considered, however, that a more important factor relates to the movement of a body such as a camper off of a vehicle bed such as a pickup truck bed. One major reason for using campers instead of various other related type of structures which frequently influences individuals to use such campers is the fact that with this type of combination the camper can be removed from the vehicle so that the vehicle can be utilized for other purposes. Thus, for example, when a camper is removed from a pickup truck, the truck can be used as a truck.

Whenever a camper is secured to a pickup truck by a permanent or essentially permanent type of means which are difficult to disconnect removal becomes difficult. As a result frequently the camper will not be removed because of lethargy or the like and as a result the truck is not used as a truck when it should or could be used as a truck. If means which are difficult to disconnect are not employed to secure a body such as a camper body to a vehicle bed such as a truck bed there is always a significant danger of the body such as a camper being stolen from the vehicle.

Brief summary of the invention

An object of the present invention is to provide new and improved means for holding or mounting a body such as a camper body or shell on a vehicle bed such as the bed of a common pickup truck. Another object of the present invention is to provide structures or means for this purpose which may be easily and conveniently used, and which are constructed in such a manner as to facilitate or make relatively simple and easy the removal of such a body from such a bed. A further object of this invention is to provide structures and means for the indicated purpose which effectively hold a body such as a camper body with respect to a vehicle bed so that there is substantially no danger of the body inadvertently being moved from the vehicle bed. A closely related object is to provide means or structures which can be used so as to lock such a body to such a bed so that there is no significant danger of the body being stolen.

These and various other objects of this invention are achieved by providing in combination with a body and a bed at least one and preferably more holding means, each of such holding means including a holder adapted to be permanently secured to the bed and a headed projection secured to the body so as to be capable of being inserted in the holder to which it corresponds when the body is located upon the bed, and lock means on the holder for engaging the headed projection so as to prevent its movement with respect to the holder.

Description of the drawing

The actual details of this invention are best explained with reference to the accompanying drawing in which:

FIG. 1 is a side-elevational view showing a common pickup truck having a bed which holds a body such as a camper body through the use of holding means as herein described;

FIG. 2 is a partial sectional view based on FIG. 1 showing in side elevation a holding means in accordance with this invention;

FIG. 3 is a view corresponding to FIG. 2 showing an end elevational view of this holding means; and FIG 4. is a bottom isometric view of the body shown in FIG. 1.

Description of the preferred embodiment

In FIG. 1 of the drawing there is shown a pickup truck 10 having a rear bed 12. It will be realized that the term "bed" as used herein defines a flat or reasonably flat surface such as is commonly found in a truck such as the truck 10 which is used for carrying-type purposes. Because of such use, beds such as the bed 12 are normally comparatively strong and are capable of being subjected to comparatively large forces without deformation.

Upon the truck 10 there is located a body 14, which as shown is preferably a common camper type body. It will be realized that such a body 14 may be constructed in virtually an unlimited number of different ways, and may have various different appearances. The body 14 may be any structure or load adapted to be secured to the bed 12 so as to be transported by the truck 10. The particular body 14 illustrated has a bottom 16 which is adapted to rest upon the bed 12 and side walls 18 which are adapted to fit within and between the sides 20 of the bed 12 on the truck 10.

In connection with the body 14 and the bed 12 a plurality of holding means 22 are preferably employed. Each of these holding means includes a bracket-like holder 24 having extending ears 26 which are adapted to be permanently secured to the bed 12 by means of bolts 28. Each holder has an internal cavity 30 beneath a top wall 32 so as to be located above the bed 12. Preferably, this cavity 30 has an open end 34 adapted to be used for cleaning out any debris which might enter the cavity 30 through an upper opening 36 formed in the wall 32. This opening 36 preferably is tapered towards the cavity 30 as shown so as to facilitate the use of the entire holding means 22.

Mounted upon the holder 24 in a conventional way so as to be permanently secured thereto, is a conventional lock barrel 38 having a key opening 40 located on the outside of the holder 24 above the bed 12. It will be realized that this lock barrel 38 is capable of being rotated with respect to the holder 24 when a key (not shown) is located within the key opening 40 and the barrel 38 is operated in a conventional manner. During such rotation a bolt or arm 42 of a conventional type connected to the lock barrel 38 is capable of being moved within the cavity 30 directly beneath the opening 36.

Each of the holding means 22 also includes a shaft 44 to a mounting bracket 46 having extending ears 48. This mounting bracket 46 is adapted to be attached to the walls 18 of the body 14 through the use of conventional fasteners 50. The shaft 44 is preferably provided with a pointed end 52 which serves as head on this shaft 44. If desired, the shaft 44 and the end 52 may be termed a headed projection. The shaft 44 may be provided with a shoulder 54 which is adapted to rest on a holder 24.

During the use of the holding means 22 indicated in the drawing, four of the holders 24 are preferably mounted adjacent to the four corners of the bottom of the bed 12 and four of the brackets 46 are mounted adjacent to the corners of the walls 18. The holders 24 and the brackets 46 are located so that when the body 14 is located on the bed 12, the shafts 44 project through the openings 36 in these holders. In this position the ends 52 are beneath the top walls 32, and are located so that the back sides 56 of these ends 52 may be engaged by the bolts 42 when the lock barrels 38 are rotated. When so engaged, the body 14 is securely locked with respect to the bed 12 so that it cannot be inadvertently dislodged and so that the body 14 cannot be stolen off of the bed 12.

Normally, there is enough room or clearance around the bottom 16 of the body 14 so that convenient access may be had to the holding means 22 so that the lock barrels 38 may be operated as described. However, it is not considered necessary with the invention that each of the lock barrels 38 be used each time a series of holding means 22 are employed. It is possible only to utilize a lock barrel 38 on one of the four holding means 22 shown in order to achieve results in accordance with this invention. Even when none of the bolts 42 are used the holding means 22 will tend to prevent inadvertent, accidental dislodging of the body 14 because of the ends 52 fitting within and tending to engage the holders 24 internally if the body 14 is not lifted directly out of the bed 12 in a vertical direction.

It will be realized that a number of changes may be made in the precise structures illustrated in the drawing and described herein without departing from the concepts embodied within the structures illustrated and described. For this reason, the invention is considered to be limited solely by the appended claims forming a part of this disclosure.

I claim:
1. In the combination of a vehicle bed and a body located upon said bed so as to be supported thereby, the improvement which comprises;
 a plurality of separate holding means for securing said body to said bed so that said body cannot be undesirably removed from said bed,
 each of said holding means including a holder attached to said bed,
 said holder having a top wall having an opening therein and an internal cavity in communication with said opening,
 each of said holding means including a headed projection attached to said body so as to extend therefrom,
 each of said projections being capable of fitting through the corresponding one of said openings so that the heads of said projections are located within said cavities,
 said holders and said projections being located upon said body in said bed so that each of said projections fit into one of said holders,
 lock means located on at least one of said holders for engaging the headed projection extending into such holder in order to lock said body with respect to said bed.

2. A combination as claimed in claim 1 wherein:
 one of said lock means is located on each of said holders.

3. A combination as claimed in claim 1 wherein:
 each of said holding means includes a bracket attached to said body and wherein said headed projections extend from said brackets.

4. A combination as claimed in claim 1 wherein each of said lock means includes:
 a barrel rotatably mounted on the corresponding one of said holders and a bolt member attached to each such barrel so as to be capable of being moved into engagement with a headed member.

5. A combination as claimed in claim 1 wherein:
 each of said holders includes a side opening leading into said cavity for use in removing debris from said cavity.

6. A combination as claimed in claim 1 wherein:
 one of said lock means is located in each of said holders,
 each of said lock means includes a barrel rotatably mounted on the holder upon which it is located and a bolt attached to said barrel so as to be capable of being moved on movement of said barrel into engagement with a headed member,
 each of said holding means includes a bracket attached to said body and wherein said headed projections extend from said brackets.

References Cited

UNITED STATES PATENTS

| | | | |
|---|---|---|---|
| 3,011,749 | 12/1961 | Kozak | 248—361 |
| 3,125,965 | 3/1964 | De Penti et al. | 105—366 |
| 3,162,419 | 12/1964 | Blasingame | 248—361 |
| 3,317,236 | 5/1967 | Connerat et al. | 296—35 |
| 3,368,785 | 2/1968 | Weiler | 248—361 |

JOHN PETO, Primary Examiner.

U.S. Cl. X.R.

248—224; 296—23